United States Patent [19]

Bürger

[11] Patent Number: 4,829,736
[45] Date of Patent: May 16, 1989

[54] GIRDER

[75] Inventor: Reinhard Bürger, Marbach, Fed. Rep. of Germany

[73] Assignee: HAAF GmbH, Stuttgart, Fed. Rep. of Germany

[21] Appl. No.: 5,237

[22] Filed: Jan. 20, 1987

[30] Foreign Application Priority Data

Jan. 29, 1986 [DE] Fed. Rep. of Germany ....... 3602575

[51] Int. Cl.$^4$ .............................................. E04C 3/30
[52] U.S. Cl. ........................................ 52/720; 52/645; 52/731
[58] Field of Search ................. 52/648, 690, 693, 730, 52/731, 632, 634, 636, 720

[56] References Cited

U.S. PATENT DOCUMENTS

| | | | |
|---|---|---|---|
| 1,527,728 | 2/1925 | Arnstein | 52/731 |
| 2,003,738 | 6/1935 | Cartwright | 52/693 X |
| 3,021,014 | 2/1962 | Korensky et al. | 52/655 |
| 3,256,671 | 6/1966 | Handley | 52/731 |
| 3,273,299 | 9/1966 | Hartung, Jr. | 52/648 |
| 3,374,593 | 3/1968 | Rensch | 52/731 X |
| 3,488,692 | 1/1970 | Oda | |
| 4,171,598 | 10/1979 | Holmes | 52/731 X |
| 4,187,034 | 2/1980 | Dziewolski | 52/693 X |
| 4,416,097 | 11/1983 | Weir | |
| 4,494,351 | 1/1985 | Thomasson | 52/731 X |
| 4,646,505 | 3/1987 | Paris | 52/731 X |

FOREIGN PATENT DOCUMENTS

| | | |
|---|---|---|
| 1169095 | 4/1964 | Fed. Rep. of Germany . |
| 3313215 | 10/1984 | Fed. Rep. of Germany . |
| 1321943 | 2/1963 | France . |
| 2530526 | 1/1984 | France . |

Primary Examiner—Carl D. Friedman
Assistant Examiner—Richard E. Chilcot, Jr.
Attorney, Agent, or Firm—Horst M. Kasper

[57] ABSTRACT

A girder includes at least one elongated profiled rod which is provided with at least one bearing surface extending longitudinally of the rod and centered on an imaginary longitudinal plane for supporting at least one associated engagement element during displacement of the latter longitudinally of the profiled rod. The profiled rod further includes two longitudinal webs extending along respective longitudinal central planes which enclose an angle with one another and intersect each other and the imaginary longitudinal plane of the bearing surface substantially in a common longitudinal axis of the profiled rod. The carrier further includes at least one girder body joined to at least one of the longitudinal webs at a transition region and extending along a common plane therewith at least at the transition region. The carrier body is advantageously constituted by a flat wall which includes at least one relatively thin-walled plate and reinforcing elements attached to the plate and reinforcing the same.

25 Claims, 1 Drawing Sheet

GIRDER

BACKGROUND OF THE INVENTION

The present invention relates to girders in general, and more particularly to a girder which includes at least one profiled rod and at least one carrying wall or a similar carrying body.

There are already known various constructions of the girders of the type here under consideration and they are in widespread use, for instance, in crane construction or in various arrangements. A special area of use of such girders for various equipment involves, for instance, handling devices as they are being currently used in modern manufacturing processes. In handling devices with straight-line basic axes, the girders must be supported on other girders for longitudinal displacement, and these other girders, in turn, are also to be movable. The displaceable mounting is achieved by means of rollers, wheels or similar elements. Inasmuch as the movements are being performed at a very rapid pace, there are encountered high axial accelerations which strongly stress the girder. Consequently, the girder must be particularly stable. Yet, the requirement for high stability is in a direct contrast to the requirements for low weight and low acceleration or inertial forces.

SUMMARY OF THE INVENTION

Accordingly, it is a general object of the present invention to avoid the disadvantages of the prior art.

More particularly, it is an object of the present invention to provide a girder which does not possess the drawbacks of the known girders used for similar purposes.

Still another object of the present invention is to devise a girder of the type here under consideration which has a very light-weight construction without sacrificing stability of the girder.

It is yet another object of the present invention to design the above girder in such a manner as to keep the inertial and acceleration forces acting thereon during movement to a minimum.

A concomitant object of the present invention is so to construct the girder of the above type as to be relatively simple in construction, inexpensive to manufacture, easy to use, and yet reliable in operation.

In keeping with these objects and others which will become apparent hereafter, one feature of the present invention resides in a girder comprising at least one elongated profiled rod including at least one bearing surface extending longitudinally of the rod and centered on an imaginary longitudinal plane for supporting at least one associated engagement element during displacement of the latter longitudinally of the profiled rod, and two longitudinal webs extending along respective longitudinal central planes which enclose an angle with one another and intersect each other and the imaginary longitudinal plane of the bearing surface substantially in a common longitudinal axis of the profiled rod, and at least one girder body joined to at least one of the longitudinal webs at a transition region and extending along a common plane therewith at least at the transition region. Advantageously, the profiled rod further includes at least two additional bearing surfaces for additional engagement elements, the additional bearing surfaces being circumferentially spaced from one another and from the one bearing surface and each being centered on an additional imaginary longitudinal plane which intersects the imaginary longitudinal plane of the one bearing surface and the longitudinal central planes of the webs substantially at the common longitudinal axis.

It may be seen from the above explanation that an important feature of the girder according to the present invention resides in the special construction of the profiled rod, along the bearing surface of which there are being moved one or more rollers or the like of another girder or of a carriage or the like. A force is applied through the one or more rollers to the profiled rod, and this force is transmitted through the two webs to the carrying wall or a similar carrying body. As a result of the special association of the bearing surface or bearing surfaces with the two webs, on the one hand, and of the respective web with the respective adjoining carrying wall, on the other hand, there is obtained an optimum transmission of the forces which are applied through the rollers to the respective profiled rod to the adjoining carrying wall or a similar carrying body. Thus, only normal stresses and shear stresses are encountered in the webs and in the carrying walls. Inasmuch as, in accordance with the present invention, the respective carrying wall which adjoins the respective web extends along a common plane with the web at least at the transition region, only shear stresses but no bending stresses and bending deformations can occur at this region.

In a single-carrier solution, the part which is shiftably supported on the single girder is carried for displacement solely on this girder. On the other hand, it is also possible to utilize two of such girders in a parallel arrangement, and to support another girder or the like on these two girders for shifting or displacement thereon. In the last-mentioned case, the requisite bearing surfaces are provided at least on one of the profiled rods of each carrier. In the one-girder solution, the bearing surfaces are provided on two profiled rods. Moreover, it is entirely possible when using a girder having more than one profiled rod to arrange a plurality of the bearing surfaces on all of the profiled rods, such bearing surfaces of each such plurality being then circumferentially distributed on the respective profiled rod. Then, in a special application case, possibly only one or only some of the bearing surfaces of each such plurality are being utilized. As a result of this, it is achieved that the girder has a particularly universal applicability and, in this manner, the designer of the system utilizing such a carrier is not unduly limited with respect to the use or design of the girders or the like. It is possible without encountering any difficulties to provide five or six of the bearing surfaces on each of the profiled rods, and such bearing surfaces may then be used in pairs or in any other numbers. Furthermore, these bearing surfaces need not be particularly pronounced surfaces; rather, they may also be constituted by the flanks of a prismatic body or by a partial region of a wall which need not necessarily be even. In other words, it is possible to move the roller or rollers or similar engagement element or elements along a peripheral surface of the profiled rod at the desired location. It is only imperative that the normal to the contact ellipse extends through the common axis of the profiled rod, this common axis being defined by the intersection line of the central planes extending through the two webs. What also follows from this is that the rollers are particularly advantageously configured as spherical or ball-shaped engagement elements. It also additionally follows from this that the "bearing surfaces" may be relatively narrow, to the extent that there are provided pronounced bearing surfaces on the peripheral surface of the profiled rod at all.

Hence, the profiled rod or each of the profiled rods constitutes a load-introduction element through which the forces applied by the engagement elements are introduced into the girder wherein the latter is a carrying element or a carrying body. The girder or the carrying element, on its part, transmits the thus introduced forces in any supports or into a further supporting element.

A particularly advantageous exemplary construction according to the present invention is characterized in that the profiled rod has a cross section which is symmetrical with respect to an imaginary longitudinal plane which halves the angle between the longitudinal central planes of the webs. Advantageously, each of the webs has a rectangular cross section. Each of the profiled rods consists in a sense of a main body provided with the bearing surface or with the bearing surfaces, and of two longitudinal webs extending outwardly of the main body. The longitudinal webs are preferably made of one piece with the main body.

According to an advantageous aspect of the present invention, the main body of the profiled rod has a circular cross section. Referring back to what has been stated before, this means that the cross section of the main body is circular and that the two webs are secured to the main body in this, as in any other construction according to the present invention. Instead of the circular cross section, there could also be used to advantage an elliptical or an oval cross section.

The bearing surfaces need not necessarily be provided as elevated or raised, or as recessed, formations; rather, they may be constituted by parts of the outer peripheral surface of the respective profiled rod. They need not be physically prominent; yet, they may be in some instances recognizable by a better surface quality. The longitudinal central planes of the webs advantageously enclose an angle substantially in the range between 30° and 90°, and this angle is preferably substantially 60°.

According to another advantageous concept of the present invention, the main body of the profiled rod has a substantially trapezoidal cross section, the webs being associated with the short base of the trapezoidal cross section. When referring to a trapezoidal there is intended to be embraced within the meaning of this term not the general trapezoidal shape, but rather the special case of a symmetrical trapezoidal shape having side edges which are inclined to the same extent but in opposite directions.

A further development of the present invention resides in the feature that the cross section of the main body of the profiled rod consists substantially of two hexagon halves of different sizes which are centrally joined with one another at their division edges, these hexagon halves corresponding to those obtained when respective hexagons are divided at division edges which extend from one corner to the oppositely located corner of the respective hexagon. The webs then are connected to and extend outwardly from the main body at respective remaining corners of the larger one of the hexagon halves, and the longitudinal central planes of the webs enclosing an angle of substantially 60° with one another. This cross-sectional shape is advantageous in the respect that it offers the possibility of accommodating a large multitude of the bearing surfaces. On the other hand, the cross section in its totality is relatively small, and this promotes the desired light-weight construction. For a further weight reduction, the central surface of the larger hexagon half may be hollowed out to a certain extent. For the same reason, it is also possible and advantageous to remove some material from the free edge regions of the larger hexagon half by an amount which can also be ascertained from FIG. 4.

A particularly advantageous construction in accordance with the present invention is obtained when the initially mentioned bearing surface is provided on one of the outer surfaces of the smaller hexagon half, and when four additional bearing surfaces are provided, two being situated each at one of the remaining outer surfaces of the smaller hexagon half, and each of the remaining two being situated at one of two of the outer surfaces of the larger hexagon half. It is particularly advantageous when the corner-to-corner dimensions of the larger and of the smaller hexagon are in a ratio of substantially 2:1 with respect to one another.

It is especially contemplated by the present invention to provide an additional profiled rod similar to the one profiled rod and transversely spaced therefrom, and to support the element which is to be displaceably supported on the girder on one of the profiled rods at the central bearing surface of the smaller semi-hexagonal prism as well as at the two outwardly situated bearing surfaces of the larger semi-hexagonal prism, and on the other of the profiled rods at a bearing surface pair which is constituted by a bearing surface provided on the larger semi-hexagonal prism and an oppositely situated bearing surface of the smaller semi-hexagonal prism. Yet, this does not constitute the only possible utilization of this cross-sectional shape; rather, it is merely one of the possibilities which is currently preferred.

When, as mentioned above, two of the profiled rods are being employed in the girder, it is contemplated for the one girders body to be a carrying wall which is connected to one of the longitudinal webs of each of the profiled rods, and to further provide two additional carrying walls each connected to the remaining one of the longitudinal webs of a different one of the profiled rods to provide respective extensions of such webs. At least the carrying wall constituting the one girder body, but preferably each of the carrying walls, is advantageously flat. In the last-mentioned case, there is obtained a structure which is comparable to a longitudinally slotted three-edged tube. The two carrying walls mounted on the free webs of the two profiled rods are preferably connected with one another only locally. According to another advantageous aspect of the present invention, at least the carrying wall which constitutes the one girders body includes two thin-walled plate-shaped elements and a central core interconnecting the plate-shaped elements. The core is advantageously of one of honeycomb and hard foam material. A particular advantage of the use of carrying walls of this construction is, on the one hand, the low weight of such composite carrying walls and, on the other hand, their good stability and shape retention capability. Such walls are comparable to sandwich plates.

Advantageously, the plate-shaped elements have respective marginal portions which extend beyond the core in the transverse direction of the profiled rod and which are rigidly connected to the outer surfaces of the respective associated longitudinal web. This means that the thickness of the longitudinal webs should substantially correspond to the distance between the two plate-shaped elements. It is particularly advantageous when the marginal portions are connected to the longitudinal web by one of gluing, riveting, and threading. It is further advantageous when a somewhat more stable end slat, especially such extending parallel to the respective longitudinal web, is inserted between the projecting marginal portions of the two free carrying walls.

A further advantageous construction is obtained when at least the carrying wall constituting the one girder body includes a thin-walled plate and reinforcing elements connected to the plate. Such reinforcing elements are advantageously elongated and extend substantially parallel to the profiled rod. However, it is also possible and contemplated by the present invention for at least the carrying wall constituting the one girder body to include two thin-walled plates and connecting webs which interconnect the plates. Advantageously, such connecting webs are elongated and extend parallel to the longitudinal direction of the girder.

BRIEF DESCRIPTION OF THE DRAWING

The present invention will be described below in more detail with reference to the accompanying drawing in which.

DETAILED DESCRIPTION OF THE PREFERRED EMBODIMENT

Figure 1:
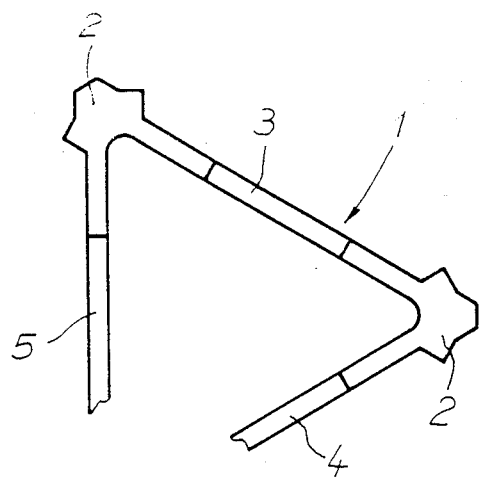
FIG. 1 is an end elevational view of a girder constructed in accordance with the present invention and extending perpendicularly to the plane of the drawing.

Referring now to the drawing in detail, and first to FIG. 1 thereof, it may be seen that the reference numeral 1 has been used therein to identify a girder which includes two profiled rods 2 of the same cross-sectional shape. The profiled rods 2 are connected with one another by a carrying wall 3. Each of the profiled rods 2 is further connected with a respective further carrying wall 5. In this manner, there is obtained a girder whose shape is comparable to that of a three-edged tube. For the sake of clarity, the cross sections of the profiled rods 2 are illustrated at an exaggerated scale. The profiled rods 2 that are shown in FIG. 1 correspond in their shapes to those of the embodiment illustrated in FIG. 4 of the drawing.

Figure 3:
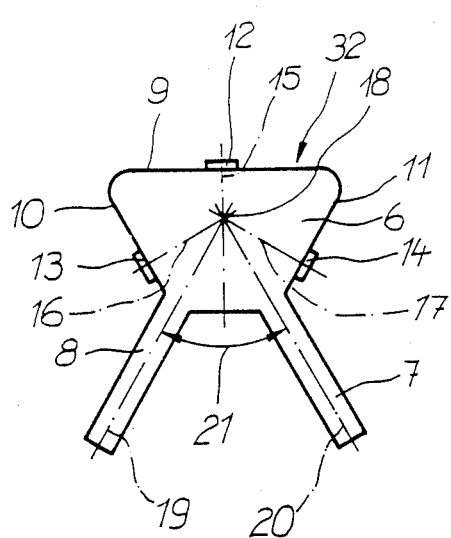
FIG. 3 is an end view of a profiled rod having a modified cross-sectional configuration.

A profiled rod which is illustrated in FIG. 3 of the drawing includes a main body 6 which can be described as being trapezoidal or approximately triangular. Two elongated webs 7 and 8, which extend at an angle with respect to one another, and are especially made of one piece, and are connected to the main body 6. The two elongated webs 7 and 8 enclose an acute angle, for instance of 60°, with one another.

On at least one, but preferably on all three, of triangle flanks 9, 10 and 11 of the three-edged main body 6, there is provided a bearing surface 12, 13 and/or 14, respectively. For the sake of clarity, these bearing surfaces 12, 13 and 14 are depicted in FIG. 3 as well as in FIGS. 2 and 4 as raised bearing surfaces. However, this is by no means necessary; rather, the respective bearing surface 12, 13 and/or 14 may be constituted by a partial surface of the associated triangle flank 9, 10 and/or 11, respectively. Of course, it is also possible for the respective bearing surface 12, 13 and/or 14 to be constituted by groove-like depressions in the associated triangle flank 9, 10 and/or 11, respectively. It is only important that the normals to the bearing surfaces 12, 13 and 14, or imaginary longitudinal planes 15, 16 and 17 which extend perpendicularly to the triangle flanks 9, 10 and 11 and especially those which extend through the centers of the bearing surfaces 12, 13 and 14, intersect each other at a common profile longitudinal axis 18. Further imaginary longitudinal central planes 19 and 20 of the two webs 7 and 8 also extend through the common profile longitudinal axis 18. Generally speaking, this is true independently of the respective cross-sectional shape of the profiled rod 2 or of its main body 6. Therefore, the common profile longitudinal axis is identified in all three constructions according to the invention with the reference numeral 18.

Figure 2:
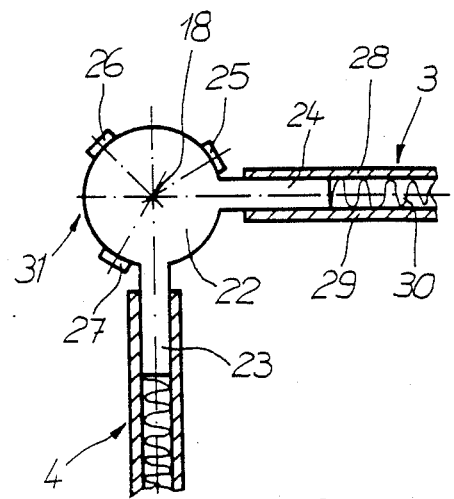
FIG. 2 is a fragmentary partially sectioned end view of one corner region of a girder of the present invention, showing one form of a profiled rod.

In the construction which is exemplified in FIG. 2 of the drawing, a main body 22 has a circular configuration, that is, the main body 22 has the shape of a circular cylinder. In this instance, two longitudinal webs 23 and 24 enclose in this construction a right angle or even a smaller angle. Three bearing surfaces 25, 26 and 27 are illustrated here, just to give an example of the bearing surface number and distribution.

The three walls 3, 4 and 5 which are shown in FIG. 1 of the drawing only diagrammatically, are illustrated in more detail in FIG. 2 of the drawing. The profiled rod as a whole is identified in FIG. 2 by the reference numeral 31. Each of the walls 3, 4 and 5 consists of two parallel, thin, plate-shaped elements 28 and 29, and a honeycomb or hard foam core 30. The plate-shaped elements 28 and 29 extend beyond the core 30, preferably in the transverse direction of the profiled rod 31. As a result of this, the plate-shaped elements 28 and 29 can be connected at their thus projecting marginal portions to the two parallel outer surfaces of the longitudinal webs 23 or 24 which extend between the elements 28 and 29.

Figure 4:
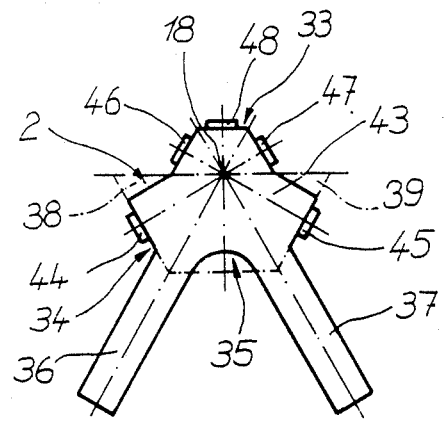
FIG. 4 is a view similar to FIG. 3 but showing a further modification corresponding to that used in FIG. 1.

In FIG. 4, there is shown a third, currently preferred, exemplary construction of a profiled rod which is again identified by the reference numeral 2. The profiled rod 2 has a cross-sectional configuration which can be basically described in the following manner: it consists of two differently large hexagon halves 33 and 34 which are joined with one another at their dividing surfaces, wherein the hexagons are divided from one corner to the oppositely situated corner. Accordingly, a basic body 43 consists of a larger and of a smaller hexagonal prism half. Herein, the corner-to-corner dimensions or circumferential circle diameters of the larger and of the smaller hexagon are in a ratio of about 2:1 to one another. Two webs 36 and 37 which are especially formed in one piece, are connected to the profiled rod 2 at two of the remaining corners of the larger half-hexagon. For a further weight reduction, the central hexagon surface of the larger hexagon half may be provided according to FIG. 4 with a hollow recess 35 or the like. Based on the same consideration, respective free edge portions 38 and 39 of the larger half-hexagon may also be removed to a certain extent. The imaginarily removed parts are indicated in FIG. 4 of the drawing on the one hand by dash-dotted lines and on the other hand by the actual peripheral lines.

This profiled rod 2 can, for instance, and in a currently preferred manner, include five bearing surfaces 44 to 48. Herein, the bearing surfaces 44 and 47, on the one hand, and 45 and 46, on the other hand, constitute respective bearing surface pairs, each for a corresponding wheel pair or pairs. When two profiled rods 2 of this construction are used on one and the same girder 1, usually not all but rather only selected ones of the bearing surfaces 44 to 48 or corresponding wheel pairs are being employed, especially the bearing surfaces 44, 45 and 48 on one, and the bearing surfaces 44 and 47 or 45 and 46 on the other, of the two profiled rods 2.

It may be seen particularly in FIG. 2 of the drawing that each web 23 or 24 and the respective associated flat carrying wall 3 or 4 which adjoins the same in its continuation extend along a common plane. When the carrying walls 23 and 24 are not flat but rather are, for instance, arched, angled or have completely different configurations, then it is still mandatory in any event that the transition region from the longitudinal web 23 or 24 to the adjoining carrying wall longitudinal marginal region extend along a common plane. In other words, for instance, when using a flat longitudinal web 23 or 24 and a flat carrying wall 3 or 4, the longitudinal central planes of these two components must not enclose any angle. Inasmuch as the girder according to the present invention may consist exclusively of a single profiled rod 2 and of a single carrying wall, such as 3, whereas the profiled rod 2 will still have even in this instance the two aforementioned longitudinal webs 23 and 24, it may be easily seen that a different longitudinal marginal portion of the single carrying wall 3 is or may be associated with each of these two longitudinal webs 23 and 24. In this case, the cross-sectional configuration of the single carrying wall 3 could be, for instance, substantially C-shaped. The carrying wall 3 determines in the first instance the shearing strength of the girder 1, while the profiled rods 2 which serve for load guidance determine the bending strength of the girder 1. The load-carrying capacity of the entire girder 1 is achieved only by the combination of these components.

A further variant of a girder of the type here under consideration is characterized in that each of the carrying walls 3, 4 and 5 consists of a thin-walled plate and of reinforcing elements, especially longitudinal ribs, notches or the like extending substantially parallel to the profiled rod 2, 31 or 32. The thickness of the thin-walled plate is particularly smaller than the thickness of the longitudinal webs 7 and 8. Preferably, the thickness of the thin-walled plate amounts to approximately 0.3 to 5 millimeters. A possibly necessary thickness adjustment can be accomplished at the transition to the associated longitudinal web 7 or 8.

A further variant of a girder of this kind is characterized in that each of the carrying walls 3, 4 and 5 consists of two thin-walled plates which are connected with one another by webs, wherein such webs extend especially parallel to the longitudinal direction of the girder. The thickness of each of these two plates is preferably in the order of magnitude of 0.3 to 1.5 millimeters. This then results in an overall thickness of up to 6 or 8 millimeters. This carrying wall can be connected to the associated longitudinal web, for instance, in the manner illustrated in FIG. 2 of the drawing. There may be provided, even in the above-discussed case, an embracing of the longitudinal web and, in this event, the end portion of the thin-walled plate must be correspondingly fitted to such circumstances as far as its shape is concerned.

While the present invention has been described and illustrated herein as embodied in several specific constructions of a girder, it is not limited to the details of these particular constructions, since various modifications and structural changes are possible and contemplated by the present invention. Thus, the scope of the present invention will be determined exclusively by the appended claims.

What is claimed is:

1. A carrier comprising at least one elongated profiled rod including at least three bearing surfaces protruding from the elongated profiled rod and symmetrically distributed over a periphery of said profiled rod and each extending longitudinally of said rod and each centered on an imaginary longitudinal plane for supporting at least one associated engagement element, and two longitudinal webs each having a longitudinal central plane and extending along said longitudinal central plane such that said longitudinal central planes enclose an angle with one another and intersect each other and said imaginary longitudinal planes of said bearing surfaces substantially in a common longitudinal axis running parallel to a longitudinal direction relative to said profiled rod, wherein the longitudinal webs are neighboring each other and where the bearing surfaces are neighboring each other in view of an angular path around the common longitudinal axis of the longitudinal planes; and at least one center body joined to at least one of said longitudinal webs and extending along said longitudinal plane thereof.

2. The girder as defined in claim 1, wherein said profiled rod further includes at least two additional bearing surfaces for additional engagement elements, said additional bearing surfaces being circumferentially spaced from one another and from said one bearing surface and each being centered on an additional imaginary longitudinal plane which intersects said imaginary longitudinal plane of said one bearing surface and said longitudinal central planes of said webs substantially at said common longitudinal axis.

3. The girder as defined in claim 1, wherein said profiled rod has a cross section which is symmetrical with respect to an imaginary longitudinal plane which halves the angle between said longitudinal central planes of said webs.

4. The girder as defined in claim 1, wherein each of said webs has a rectangular cross section.

5. The girder as defined in claim 1, wherein said profiled rod has a main body of a circular cross section, said webs being connected to and extending outwardly from said main body.

6. The girder as defined in claim 1, wherein said longitudinal central planes of said webs enclose an angle substantially in the range between 30° and 90°.

7. The girder as defined in claim 6, wherein said angle is substantially 60°.

8. The girder as defined in claim 1, wherein said profiled rod has a main body of a substantially trapezoidal cross section, said webs being connected to and extending outwardly from said main body at a short base of said trapezoidal cross section.

9. The girder as defined in claim 1, further comprising an additional profiled rod similar to said one profiled rod and transversely spaced therefrom; wherein said one carrier body is a carrying wall which is connected to one of said longitudinal webs of each of said profiled rods; and further comprising two additional carrying walls each connected to the remaining one of said longitudinal webs of each of said profiled rods.

10. The girder as defined in claim 9, wherein at least said carrying wall constituting said one girder body is flat.

11. The girder as defined in claim 10, wherein at least said carrying wall constituting said one carrier body includes two thin-walled plate-shaped elements and a central core interconnecting said plate-shaped elements and formed as one of honeycomb and hard foam material.

12. The girder as defined in claim 11, wherein said plate-shaped elements have respective marginal portions which extend beyond said core in the transverse direction of the profiled rod and which are rigidly connected to the outer surfaces of the respective associated longitudinal web.

13. The girder as defined in claim 12, wherein said marginal portions are connected to said longitudinal web by one of gluing, riveting, and threading.

14. The girder as defined in claim 9, wherein at least said carrying wall constituting said one girder body includes a thin-walled plate and reinforcing elements connected to said plate.

15. The girder as defined in claim 14, wherein said reinforcing elements are elongated and extend substantially parallel to said profiled rod.

16. The girder as defined in claim 9, wherein at least said carrying wall constituting said one girder body includes two thin-walled plates and connecting webs which interconnect said plates.

17. The girder as defined in claim 16, wherein said connecting webs are elongated and extend parallel to the longitudinal direction of the carrier.

18. The carrier as defined in claim 9, wherein said two additional carrier walls are connected with one another.

19. A carrier comprising:
at least one elongated profiled rod including at least three bearing surfaces symmetrically distributed over a periphery of said profiled rod and each extending longitudinally of said rod each centered on an imaginary longitudinal plane for supporting at least one associated engagement element, and two longitudinal webs each having a longitudinal central plane and extending along said longitudinal central plane such that said longitudinal central planes enclose an angle with one another and intersect each other and said imaginary longitudinal planes of said bearing surfaces substantially in a common longitudinal axis running parallel to a longitudinal direction relative to said profiled rod, wherein said profiled rod has a main body of a cross-section consisting substantially of two hexagon halves of different sizes which are centrally joined with each other at their division edges, said webs being connected to and extending outwardly from said main body at respective corners of the larger one of said hexagon halves and said longitudinal central planes of said webs enclosing and angle of substantially 60° with one another; and
at least one center body joined to at least one of said longitudinal webs and extending along said longitudinal plane thereof.

20. The girder as defined in claim 19, wherein said one bearing surface is provided on one of the outer surfaces of the smaller hexagon half; and wherein four additional bearing surfaces are provided, two being situated each at one of the remaining outer surfaces of the smaller hexagon half, and each of the remaining two being situated at one of two of the outer surfaces of the larger hexagon half.

21. A carrier comprising:
at least one elongated profiled rod including at least three bearing surfaces symmetrically distributed over a periphery of said profiled rod and each extending longitudinally of said rod each centered on an imaginary longitudinal plane for supporting at least one associated engagement element, and two longitudinal webs each having a longitudinal central plane and extending along said longitudinal central plane such that said longitudinal central planes enclose an angle with one another and intersect each other and said imaginary longitudinal planes of said bearing surfaces substantially in a common longitudinal axis running parallel to a longitudinal direction relative to said profiled rod, wherein said profiled rod has a main body of a circular cross-section said webs being connected to and extending outwardly from said main body at the periphery of the main body and said longitudinal central planes of said webs enclosing an angle of at least 60° with one another; and
at least one center body joined to at least one of said longitudinal webs and extending along said longitudinal plane thereof.

22. The carrier according to claim 21 wherein the longitudinal planes of the webs enclose an angle of substantially 90° degrees with each other. longitudinal axis running parallel to a longitudinal direction relative to said profiled rod, wherein said profiled rod has a main body of a substantially trapezoidal cross-section said webs being connected to and extending outwardly from said main body at corners adjoining said short base of the substantially trapezoidal main body and said longitudinal central planes of said webs enclosing an angle of at least 60° with one another and wherein each of the three bearing surfaces is disposed on one each of three respective remaining surfaces of the trapezoidal main body; and
at least one center body joined to at least one of said longitudinal webs and extending along said longitudinal plane thereof.

23. The carrier according to claim 21 wherein the longitudinal planes of the webs enclose an angle of substantially 60° degrees with each other.

24. The carrier according to claim 21 wherein the angled faces of the main trapezoidal body enclose with each other and with the long base an angle of substantially 60° degrees.

25. A carrier comprising at least one elongated profiled rod including at least three bearing surfaces symmetrically distributed over a periphery of said profiled rod and each extending longitudinally of said rod each centered on an imaginary longitudinal plane for supporting at least one associated engagement element, and two longitudinal webs each having a longitudinal central plane and extending along said longitudinal central plane such that said longitudinal central planes enclose an angle with one another and intersect each other and said imaginary longitudinal planes of said bearing surfaces substantially in a common

* * * * *